(12) United States Patent
Hanson et al.

(10) Patent No.: US 6,398,225 B1
(45) Date of Patent: Jun. 4, 2002

(54) SEAL FOR A ROTARY VALVE FOR HIGH TEMPERATURE AND HIGH PRESSURE FLUIDS

(75) Inventors: Richard W. Hanson, Beaverton; John C. Schmoegner, Lake Oswego, both of OR (US)

(73) Assignee: DCI International, Newberg, OR (US)

( * ) Notice: Subject to any disclaimer, the term of this patent is extended or adjusted under 35 U.S.C. 154(b) by 0 days.

(21) Appl. No.: 09/156,372

(22) Filed: Sep. 17, 1998

(51) Int. Cl.[7] .................................................. F16K 5/02
(52) U.S. Cl. ........................ 277/607; 277/616; 277/435; 277/637; 277/652; 277/946; 251/314; 251/317.01
(58) Field of Search ................................ 277/607, 616, 277/625, 435, 637, 652, 946; 251/314, 317.01

(56) References Cited

U.S. PATENT DOCUMENTS

| | | | |
|---|---|---|---|
| 2,183,296 A | * 12/1939 | Marx | |
| 3,650,304 A | 3/1972 | Hendershot | |
| 4,073,308 A | * 2/1978 | Smith | |
| 4,365,646 A | 12/1982 | Sandling | |
| 4,410,003 A | 10/1983 | Sandling | |
| 4,478,388 A | * 10/1984 | George | 251/309 |
| 4,494,730 A | 1/1985 | George | |
| 4,564,044 A | 1/1986 | Biller et al. | |
| 4,711,264 A | 12/1987 | Medvid | |
| 5,901,944 A | * 5/1999 | Ramakrishnan | |

* cited by examiner

*Primary Examiner*—Chuck Y. Mah
*Assistant Examiner*—Enoch E Peavey
(74) *Attorney, Agent, or Firm*—Birdwell, Janke & Durando, PLC

(57) ABSTRACT

An improved seal for a rotary valve for high temperature and high pressure fluids. A removable seal member adapted for disposition between a valve body and a valve member rotatably disposed in the valve body is provided. In one aspect of the invention, the seal member is adapted so that pressure exerted by the valve is sufficient to induce cold flow in the seal member. In another aspect of the invention, the seal member includes a pair of longitudinally disposed slots.

9 Claims, 3 Drawing Sheets

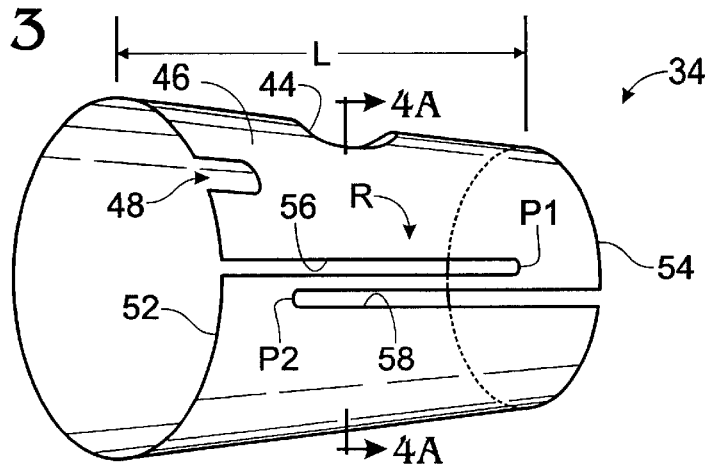
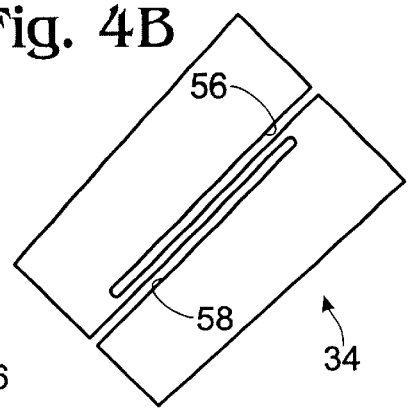
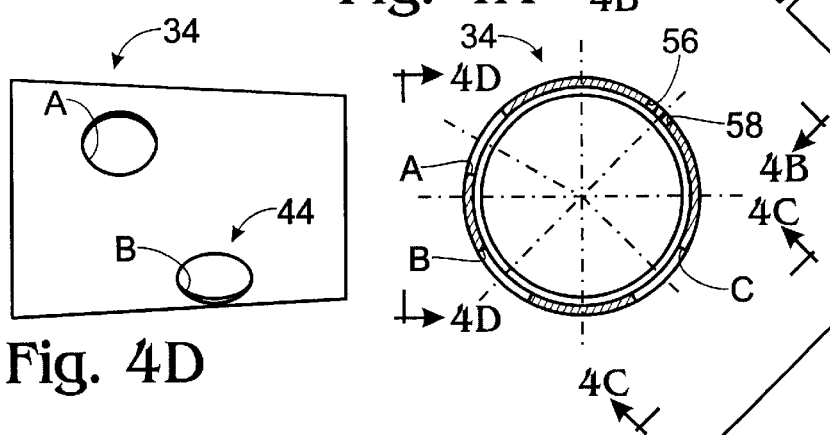
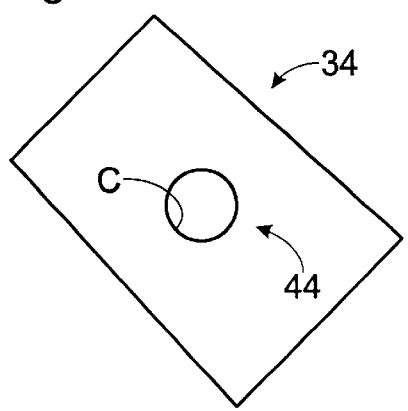

SEAL FOR A ROTARY VALVE FOR HIGH TEMPERATURE AND HIGH PRESSURE FLUIDS

BACKGROUND OF THE INVENTION

The present invention relates to an improved seal for a rotary valve for controlling the flow of fluids at high temperature and pressure. More particularly, the invention relates to an improved seal for a valve for use in a device for sterilizing dental tools known in that art as a "Harvey" sterilizer.

In the medical arts there is a continual need to sterilize surgical instruments. The Harvey sterilizer, in particular, was developed over 50 years ago for use in the art of sterilizing dental instruments, and is in common use today in substantially the same form. It is presently marketed by Barnstead/Thermolyne, of Dubuqe, Iowa, as the HARVEY CHEMICLAVE.

The Harvey sterilizer is similar to an autoclave, but employs higher temperatures and pressures for its sterilizing agent, typically a formaldehyde/alcohol solution. For example, the sterilizing chamber of the Harvey sterilizer employs temperatures and pressures of about 270 degrees Fahrenheit and about 28–30 p.s.i.g., as compared to about 250 degrees Fahrenheit and about 15 p.s.i.g. used in an autoclave.

The action of the Harvey sterilizer is critically dependent on that of a rotary valve described in Hendershot, U.S. Pat. No. 3,650,305, incorporated by reference herein in its entirety. Basically, the valve may be rotated to provide selectable fluid paths between various components of the sterilizer. Particularly, in a first limit position of the valve, a measuring or metering chamber is connected to a reservoir, for filling the metering chamber with a sterilizing agent, typically a formaldehyde/alcohol solution. A second limit position of the valve empties the measuring chamber into a sterilization chamber. A third, intermediate position of the valve vents the measuring chamber and a fourth intermediate position vents the sterilizing chamber.

The valve comprises a valve member and a valve body rotatably mounted inside the valve body. The valve member has a frusto-conical shape and is received by a similarly shaped aperture in the valve body. A coil spring presses the valve member into the valve body. The valve member includes a plurality of ports and internal passages connecting selected ports together. The valve body has a mating plurality of ports connected to the various structures mentioned above.

It is undesirable for hot, high pressure sterilizing fluid and vapor to leak between the ports, or between the ports and the atmosphere. To prevent this, the valve member has been treated to accept a coating of polytetrafluoroethylene ("PTFE"), and the coated surface is subsequently machined to high tolerance for mating to a particular, selected valve body. Manufacturing costs are high and degradation of the seal requires replacing the entire valve assembly.

Prior attempts to provide economical leak-proof sealing in a Harvey sterilizer valve have employed "O" rings, rubber or silicone seals around the ports. However, these leave space between the valve body and the valve member, permitting the unwanted transmission of hot liquid and vapor between the ports once the valve member is turned so that the ports are not aligned.

Accordingly, there is a need for an improved seal for a rotary valve for high temperature and high pressure fluids that provides for more economical manufacture and repair of the valve.

SUMMARY OF THE INVENTION

An improved seal for a rotary valve for high temperature and high pressure fluids according to the present invention solves the aforementioned problems and meets the aforementioned needs by providing a removable seal member adapted for disposition between a valve body and a valve member rotatably disposed in the valve body. The seal member is removably retained with respect to a selected one of the valve body and valve member, and has one or more apertures through a side-wall thereof corresponding to one or more ports associated with the selected one of the valve body and valve member.

In one aspect of the invention, the seal member is adapted so that pressure exerted thereon by the valve is sufficient to induce cold flow in the seal member, to better seal between the valve body and the valve member and to better absorb mechanical tolerances. Preferably, the seal member has a constant thickness, which is particularly advantageous in the Harvey sterilizer. Preferably as well, the seal member substantially fills the space between the valve body and the valve member, exclusive of its apertures.

In another aspect of the invention, the seal member is elongate and has two ends, and includes a pair of longitudinally disposed slots extending through the side-wall. Each slot extends from one of the ends and extends more than half-way across the elongate dimension of the seal member toward the other end and "overlaps" the other slot, as discerned when traveling circumferentially around the seal member.

Therefore, it is a principal object of the present invention to provide a novel and improved seal for a rotary valve for high temperature and high pressure fluids.

It is another object of the present invention to provide such a valve that provides for increased economy of manufacture.

It is still another object of the present invention to provide such a valve that provides for increased economy of repair.

It is yet another object of the present invention to provide such a valve that provides for improved leak resistance.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 3 is a pictorial view of a seal member according to the present invention.

FIG. 4A is a section view of the seal member of FIG. 3, taken along a line 4A—4A thereof.

FIG. 4B is a side view of the seal member of FIG. 4A, taken along a line 4b—4b thereof.

FIG. 4C is a side view of the seal member of FIG. 4A, taken along a line 4c—4c thereof.

FIG. 4D is a side view of the seal member of FIG. 4A, taken along a line 4d—4d thereof.

DETAILED DESCRIPTION OF A PREFERRED EMBODIMENT

Figure 1:
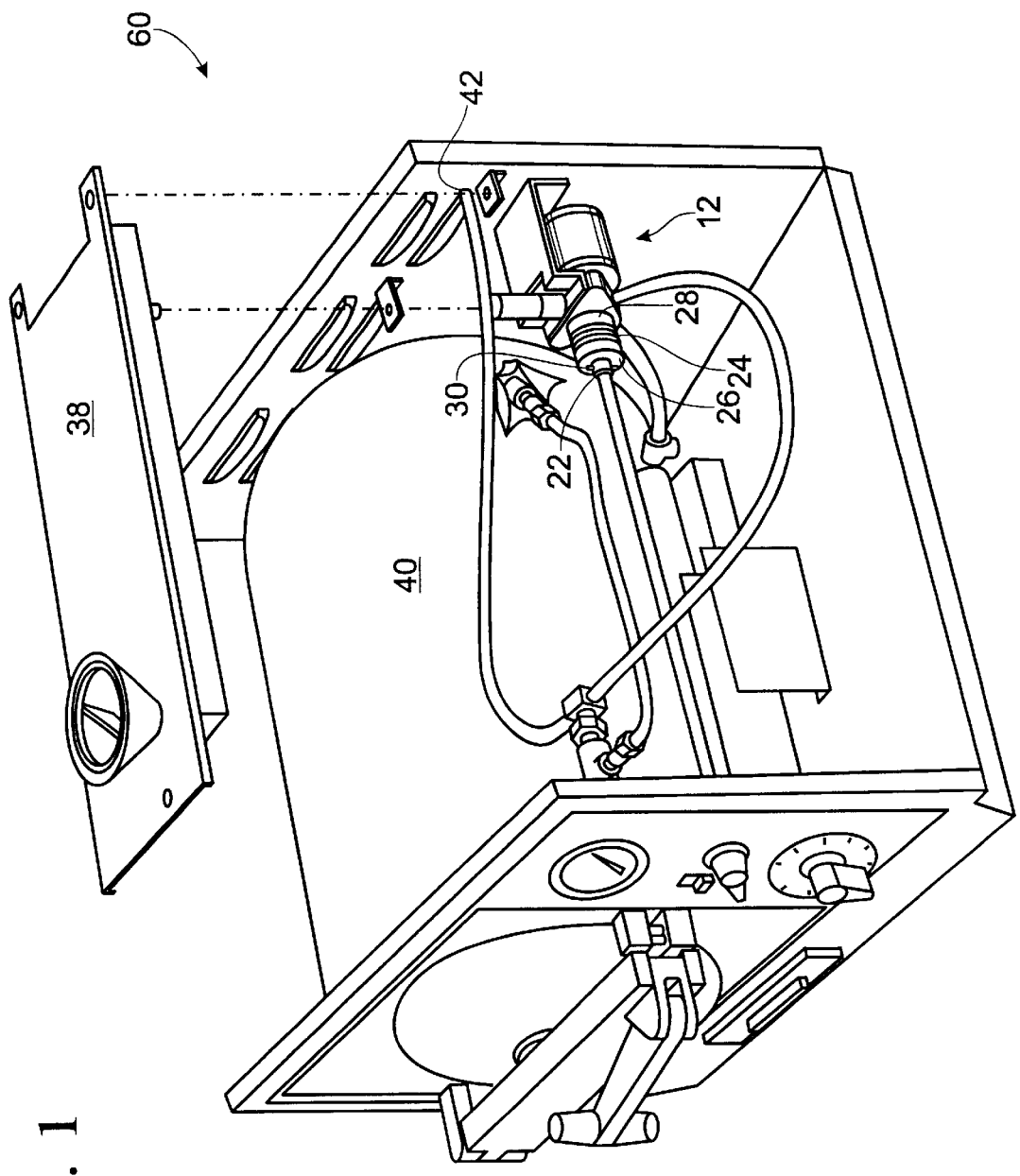
FIG. 1 is a pictorial view of a prior art sterilizing apparatus.

A preferred embodiment of an improved seal 10 for a rotary valve 12 for high temperature and high pressure fluids according to the present invention is described. As explained above, the invention is particularly adapted for use with a Harvey sterilizer valve; however, the invention may be employed with other rotary valves without departing from the principles thereof. A Harvey sterilizer apparatus 60 is shown in FIG. 1.

Figure 2:
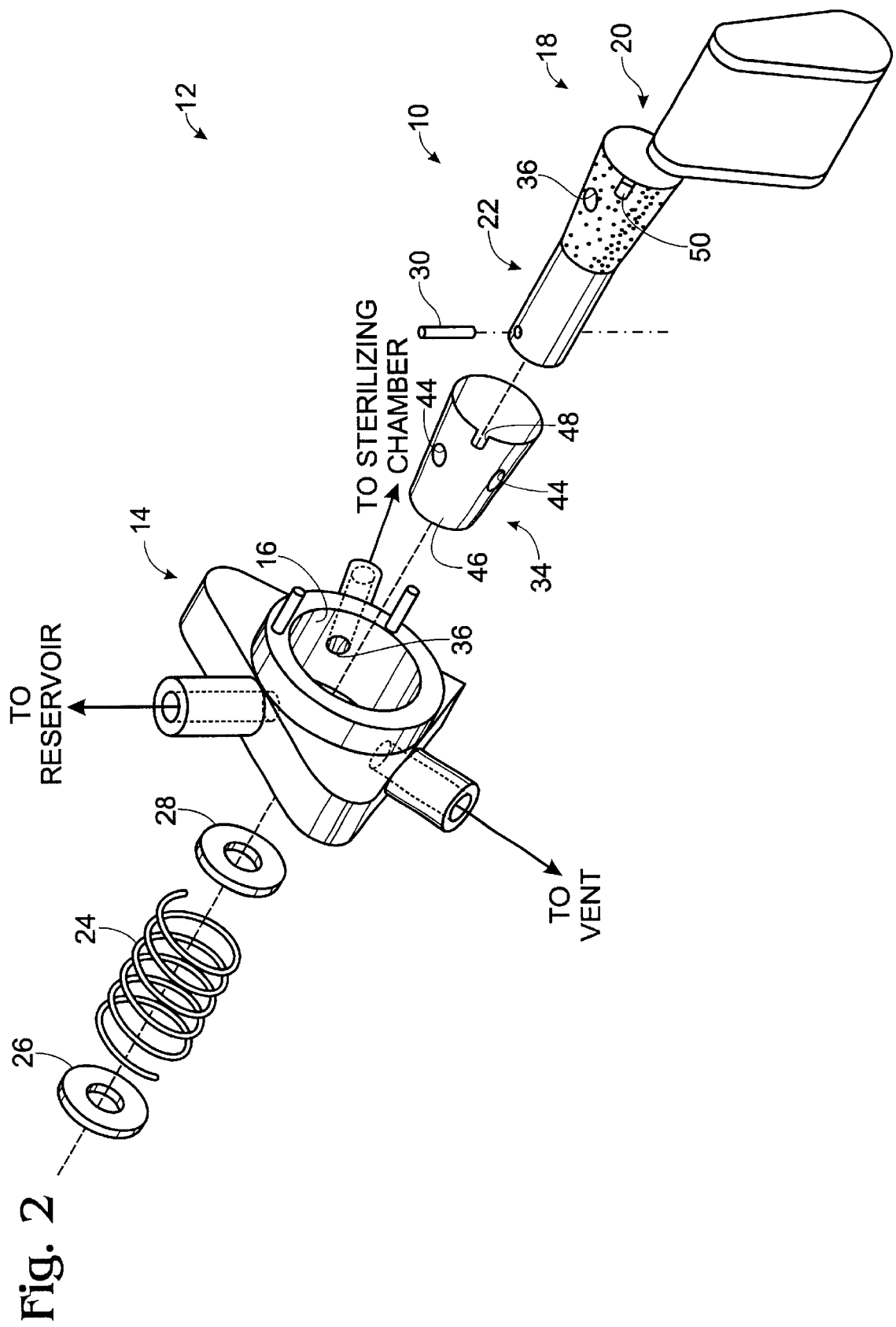
FIG. 2 is an exploded view of a rotary valve for high temperature and high pressure fluids, including an improved seal therefor according to the present invention.

Turning to FIG. 2, the valve 12 has a valve body 14 with a substantially frusto-conically shaped mounting aperture 16 extending therethrough, tapered at about 5° on a side. The aperture 16 is shaped to receive a valve member 18 having a valve portion 20 that is matingly frusto-conically shaped. The valve portion 20 of the valve member is held against the aperture 16 by a coiled compression spring 24 adapted to be placed around an extended end 22 of the valve member and be captured between washers 26 and 28 by a pin 30. The spring 24 forces the washer 26 away from the valve body 14, pulling the valve member 18 into the aperture 16 where the valve portion 20 is retained by virtue of its frusto-conical shape in conjunction with that of the aperture 16. The invention may, however, be used in a valve with an aperture 16 having some other shape and employing other means for providing pressure between the valve body and the valve member without departing from the principles thereof. For example, a cylindrical aperture 16 may be provided and pressure between the valve portion 20 and the aperture may be introduced by, for example, an interference fit.

The valve body 14 and the valve member 18 each have a plurality of ports 36 for selectably transmitting sterilizing fluid between the following components of the Harvey sterilizer apparatus 60: a reservoir 38, a sterilizing chamber 40 and a vent 42. In various selected rotary positions of the valve member 18, selected ports in the valve portion 20 align with selected ports in the aperture 16, as necessary to provide for the various flow routes desired between these components.

In the selected rotary positions, fluid communication between the corresponding ports is enabled by aligning the ports. However, it is desirable that fluid communication between non-selected ports is prevented. Moreover, when rotating the valve member from one rotary position to another, over the range of movement in which the selected ports come out of alignment and cease to enable fluid communication therebetween, it is desirable that fluid communication between any of the selected ports and other ports that have not been selected is prevented.

The valve body and valve member are typically formed of a metal to durably withstand the high temperatures and pressures employed in the sterilizing apparatus in which it is used. As aforementioned, such temperatures and pressures are typically about 270 degrees Fahrenheit and about 28–30 p.s.i.g. Achieving an adequate metal to metal seal between the mounting aperture 16 of the valve body and the valve portion 20 of the valve member to meet the foregoing requirements requires exceptionally precise machining and is found to be economically impractical. Alternatively, as has been done in the past, one or the other may be coated with a PTFE sealing material which is subsequently machined to match a particular valve body. Though the machining is less demanding than that which would otherwise be required, the process remains undesirably costly.

To improve both the reliability of the seal and the economy of its manufacture and repair, the present invention provides a removable seal member 34 for disposition between the valve body and the valve member; particularly between the aperture 16 and the valve portion 20. The removable seal member is separately molded at very low cost, which also lowers the cost of manufacturing the valve as a whole. The valve is easily assembled with the additional part, and the seal member is easily removed for repair of the valve. Moreover, use of the removable seal member permits replacing only the relatively inexpensive seal member where the valve malfunctions, potentially resulting in very large cost savings over the life of the valve.

The seal member 34 is adapted to be registered to one or the other of the valve body 14 and the valve member 18. It has been found most convenient to register the seal member to the valve member 18, by forming a notch 48 in the seal member for fitting around a pin 50 in the valve member, as shown in FIG. 2.

Referring to FIG. 2 or 3, the seal member 34 is elongate and includes apertures 44 through a side-wall 46 thereof that correspond to the pattern of the ports 36 in the object to which the seal member is fixedly retained, here the valve member 18. Thence, to the degree that the sizes, shapes and locations of the apertures 44 are matched to those of the ports 36 in the object to which the seal member is fixedly retained, the seal member 34 permits coupling between selected ports to substantially the same extent that such coupling would be permitted if the seal member were omitted. Where the seal member is retained with respect to the valve member 18, the seal member rotates with the valve member.

In one aspect of the invention, the seal member is adapted to "cold flow" for a given force exerted by the coil spring 24. In cold flow, the material plastically deforms and "flows" substantially irreversibly under a stress, here provided by the coil spring 24. This both improves sealing, making the valve more leak resistant, as well as decreases still further the traditional requirement to machine and match parts to accommodate dimensional tolerances.

The seal member is preferably formed of PTFE, for its heat and corrosion resistance and lubricity. More particularly, it has been found advantageous for injection molding the seal member to form it from TEFLON FEP, a fluorinated ethylene propylene marketed by the DuPont Chemical Corporation of Wilmington, Del. Notwithstanding, other materials providing for desired sealing characteristics may be employed for the seal member without departing from the principles of the invention.

Preferably the seal member 34 is provided with a substantially constant thickness. This permits achieving a uniform distribution of stress over the seal member while facilitating economical manufacture of the seal member, the valve body and the valve member. This feature is particularly advantageous in the Harvey sterilizer apparatus, wherein the aperture 16 and the valve portion 20 are substantially frusto-conically shaped. The seal member 34 translates in the direction of its elongate axis in response to pressure from the coil spring 24, to the extent that the interfering mating surfaces allow by virtue of their compliance. Any projections from either of the surfaces of the seal member, as would arise where the side-wall of the seal member is not of constant thickness, would accept a larger share of the total stress, relieving the stress at other locations on the side-wall. This would decrease overall sealing strength as well as cold flow at the locations in which stress has been relieved.

Preferably as well, the seal member substantially fills the space between the aperture 16 of the valve body 14 and the valve portion 20 of the valve member 18, exclusive of the apertures 36. To the extent this is provided, the valve member may be rotated a greater degree without leaking;

particularly between any of the ports of the valve body, between any of the ports of the valve member, between any of the ports, and between any port and the outside of the valve.

The valve 12 as employed in the Harvey sterilizer 60 of FIG. 1 is typically provided with a coil spring 24 that exerts about 16 pounds of force on the seal member 34. A preferred seal member is made shorter than the axial extent of the aperture 16 and valve portion 20, to a length "L" (see FIG. 3) of about 0.56" for the Harvey sterilizer 60, to increase the stress thereon. The preferred seal member then has a surface area of about 0.8 square inches. The preferred seal member also has a constant thickness of about 0.040 inches. Cold flow has been found satisfactory under these conditions and, further, cold flow is increased during use of the valve for sterilizing, wherein temperatures of about 270 degrees Fahrenheit are reached. In general, according to the principles of the invention, dimensions, forces and temperatures may be adjusted in combination to achieve cold flow in the seal member, wherein it has been found that the need for the costly special machining required by the prior art is eliminated.

Referring to FIG. 3, in another aspect of the invention, the seal member 34 includes a pair of longitudinally disposed slots extending through the side-wall 46. A first slot 56 of the pair extends from the end 52 to a point "P1" which is more than half-way along the length "L" of the seal member. A second slot 58 of the pair extends from the end 54 to a point "P2" which is also more than half-way along the length "L". Thence, the slots "overlap" in the sense that there is a circumferential region "R" on the surface of the side-wall 46 that includes portions of both slots 56 and 58. For the above described preferred seal member 34, each slot is about 0.39" long and about 0.020" wide. The slots allow the seal member to radially expand or contract slightly to take up to an even greater degree the manufacturing tolerances in the valve body and valve member as well as the seal member itself. Employing two slots 56 and 58 with the aforementioned overlap, it has been found that the slots reliably provide for interchangeability of seal members for Harvey sterilizers, so that costly selection and matching can be completely eliminated.

Best results with the slots 56 and 58 have been found where the slots are disposed in relation to apertures 44 labeled "A", "B" and "C" as shown in FIGS. 4A–4D for use in the typical Harvey sterilizer apparatus 60, though this relationship between the slots and the ports is not essential. In the preferred relationship, the slots are spaced along the circumference of the seal member so as to be relatively far from all of the ports. For example, in FIG. 4A, the slots 56 and 58 are about 90 degrees away from the aperture "C" and about 105 degrees away from the aperture "A".

It is to be recognized that, while a specific improved seal for a rotary valve for high temperature and high pressure fluids has been shown and described as preferred, other configurations could be utilized, in addition to configurations already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

We claim:

1. An improved seal for a rotary valve that includes a valve body having a frusto-conical mounting aperture and a substantially mating frusto-conially shaped valve member rotatably mounted in the mounting aperture, the valve body having a port adapted for the transmission of a fluid, the valve member having a port for fluid communication with the port of the valve body in a first rotary position of the valve member, the valve being adapted for rotating the valve member from the first rotary position to a second rotary position wherein the port of the valve body and the port of the valve member are not in fluid communication, the seal comprising a seal member adapted to be removably retained with respect to a selected one of the valve body and valve member therebetween, said seal member having an aperture through a side-wall thereof corresponding to the port associated with said selected one of the valve body and valve member when the valve member is in the first rotary position, said seal member having a substantially constant thickness of about 0.04 inches.

2. The seal of claim 1, wherein said seal member is formed of PTFE.

3. The seal of claim 1, wherein the rotary valve is adapted to press said seal member against the valve member and the valve body with a predetermined pressure, wherein said seal member is adapted so that said pressure is sufficient to cause cold flow in at least a portion of said seal member at about room temperature.

4. The seal of claim 1, wherein the rotary valve is adapted to press said seal member against the valve member and the valve body with a predetermined pressure, wherein said seal member is adapted so that said pressure is sufficient to cause cold flow in at least a substantial portion of said seal member at temperatures not more than about 270 degrees Fahrenheit.

5. The seal of claim 3, wherein said pressure is not more than about 20 p.s.i.g.

6. The seal of claim 4, wherein said pressure is not more than about 20 p.s.i.g.

7. The seal of claim 1, wherein the valve member includes a connecting member for registering said seal member to the valve member.

8. The seal of claim 1, wherein said seal member substantially fills the space between the valve body and the valve member defined by the surface areas thereof lying between and inclusive of the ports in the second rotary position, to substantially prevent leaking between the valve member and the valve body in any position of the rotary valve between and inclusive of the first rotary position and the second rotary position.

9. The seal of claim 1, wherein said seal member is elongate and has two ends, wherein said seal member further includes a pair of longitudinally disposed slots extending through said side-wall, wherein a first slot of said pair extends from said first end to a point more than half-way between said first end and said second end in the direction toward said second end, and wherein said second slot extends from said second end to a point more than half-way between said first end and said second end in the direction toward said first end.

* * * * *